United States Patent Office 3,824,123
Patented July 16, 1974

3,824,123
NOVEL GLASSES AND PROCESSES FOR THE PREPARATION THEREOF
Herbert D. Kivlighn, Jr., Bethpage, N.Y., assignor to Grumman Aerospace Corporation, Bethpage, N.Y.
No Drawing. Continuation-in-part of abandoned application Ser. No. 71,427, Sept. 11, 1970. This application Dec. 5, 1972, Ser. No. 311,962
Int. Cl. C03c 17/00, 17/06, 21/00
U.S. Cl. 117—124 C                    10 Claims

ABSTRACT OF THE DISCLOSURE

A process disclosed for producing a thin film of elemental germanium on the surface of a germanate glass composition.

This application is a continuation-in-part of application Ser. No. 71,427, filed Sept. 11, 1970, now abandoned.

This invention is concerned with novel glasses and processes for making them. More particularly, it is concerned with non-stoichiometric glasses prepared from germanium dioxide and silicon carbide, which have excellent infrared light transmission properties and improved workability in the molten state, particularly with reference to stoichiometric germanium dioxide glass.

BACKGROUND OF THE INVENTION

It is a matter of common knowledge and experience that silica glasses, i.e., those prepared from sand by well known and time honored techniques, will not transmit light rays of infrared wave length very efficiently. Therefore, the designers of optical instruments, for example, infrared spectrophotometers, which use such light rays have had to employ materials other than silica glass for the prisms, lenses and sample cells of their devices.

It is still common today, for example, to see such optics made of crystalline sodium chloride. In addition to being expensive to fabricate, sodium chloride optics must be stored in a desiccator when not in use to prevent irreversible fogging by moisture in the air. They must be carefully handled to prevent being fingerprinted; and eventually, fogged or scratched sodium chloride optics must be restored by expert repolishing.

It has been found that glasses made from mixtures of germanium, e.g., germanium dioxide, with other components, such as lead compounds, have optical properties, particularly infrared transmission properties, different from silica glasses. Such glasses are disclosed in U.S. 1,607,817. However, the glasses described are difficult to fabricate and mold because they have a relatively high melt viscosity. Moreover, the thicker the glass, the less infrared wavelength light is transmitted so thin, easily breakable windows must be used.

Easier working germania glasses are provided by the techniques disclosed, respectively in U.S. 2,691,599 and 2,701,208. These glasses use a small amount of a third component, e.g., up to 3 mol percent of zirconia or up to about 13% lanthana to improve workability. The infrared transmission of such glasses is excellent but workability is not entirely satisfactory. Furthermore, it is disclosed that silicon, boron or phosphorus, even in small amounts in these glasses will cut off infrared transmission.

In spite of these teachings, there have, in fact, been recently provided germanium containing glasses, containing phosphorus, with good infrared transmission characteristics. However, these glasses, described in U.S. 3,338,728 might more properly be designated tellurium glasses since this latter element predominates in them, germanium comprising only from 11 to 26 atomic percent.

It is also known that thin films of elements can be put on non-conducting substrates by employing a vapor deposition technique. Such techniques are somewhat disadvantageous because they require special apparatus, such as high vacuum pumps, and thickness is difficult to control. Glass covered by a thin film of elemental metal, e.g., germanium, is desirable, for example, because of its highly glossy surface finish. Such an article can be subjected to a chemical etching operation to provide a patterned semi-conducting germanium array for use in electronic devices.

Thus, in the present state of the art, it would be of substantial benefit to provide a glass with a thin film of highly glossy elemental germanium on its surface. Advantageously too, the glass would have good infrared transmitting properties and would be prepared from relatively inexpensive germania. An especially advantageous glass would be one which is of improved workability because of having a low melt viscosity. Furthermore, infrared transmission should be good in relatively thick pieces. Moreover, it would be unexpected to find that such properties could be obtained by forming a glass predominately of germania and a small, non-equimolar amount of a silicon compound, specifically, silicon carbide.

Such a glass is the subject matter of this invention. As will be seen from the disclosure, preparing the glass and subsequently precipitating elemental germanium on its surface are also features of the invention. To secure the desired properties the glass must be prepared in a specific and sensible manner.

It is therefore a primary object of this invention to provide novel glasses with improved optical, mechanical and surface properties.

It is a further object of this invention to provide glasses with a thin film of highly glossy germanium precipitated in the region near the surface.

It is another object of this invention to provide glasses from germanium and silicon with excellent infrared transmission properties, which are relatively independent of thickness.

Another object of the invention is to provide glasses with less tendency to devitrify than pure germanium dioxide glasses.

Still another object of this invention is to provide a family of glasses of improved workability in the molten state, as compared to glasses from germanium dioxide alone, facilitating their fabrication by casting, pressing or continuous tube drawing.

A further object is to provide a family of glasses which can be tempered to high strengths more efficiently than silica glasses.

It is also an object of this invention to provide processes to manufacture such glasses.

DESCRIPTION OF THE INVENTION

According to this invention, therefore, there is provided a glass comprising germanium dioxide and a minor, non-equimolar amount of silicon carbide.

A preferred feature of this invention is a glass in which there is from 0.85 to 0.999 mol of germanium dioxide, and the remainder, from 0.15 mol to a trace, is silicon carbide.

An especially preferred glass according to this invention is one comprising from about 0.95 mol of germanium dioxide and about 0.05 mol of silicon carbide.

When used herein and in the appended claims, the term "minor, non-equimolar amount" contemplates a proportion of silicon carbide less than that theoretically required to enter into complete chemical reaction with the germanium dioxide. The advantages outlined above are obtained only if at least some of the germanium remains uncombined chemically with silicon carbide. The upper limit of silicon carbide content will therefore be only slightly less than the equimolar amount; while the lower limit will be only a trace e.g., about 0.001 mol per 0.999 mol of germanium dioxide.

Of course, the properties of the family of glasses will vary over this range of silicon carbide content. For example, glasses most easily worked will have higher contents, and those with best infrared transmitting properties will have lower contents, of silicon carbide. Moreover, higher silicon carbide content glasses are a little more difficult to prepare because there is a tendency for them to fume and foam during fusion. Techniques for producing glasses in spite of fuming and foaming over this entire composition range are, however, familiar to those skilled in the art.

In any event, it is preferred to use from about 0.15 mol to a trace, and especially about 0.05 mol of silicon carbide because it is easier to obtain light colored and water-white glasses in standard equipment without excessive fuming and foaming. Especially excellent glasses will be produced at ratios of about 0.05 mol of silicon carbide to 0.95 mol of germanium dioxide.

An important aspect of this invention is a process to make the instant novel family of non-stoichiometric germanium dioxide glasses. This process comprises heating together a mixture of powdered germanium dioxide and a minor, non-equimolar amount of silicon carbide at a temperature of between about 1200 and 1600° C. in a container free of platinum and then allowing the melt to cool and solidify.

Especially preferred features of this invention comprise carrying out such processes with mixtures of 0.85 to .999 mol of germanium dioxide, and the remainder, from 0.15 mol to a trace, of silicon carbide. Even more preferred mixtures comprise 0.95 mol of germanium dioxide and about 0.05 mol of silicon carbide.

The melting temperature will be between about 1200 and 1600° C., preferably between about 1300° C. and 1550° C.

The melting can be carried out in any conventional manner. An electric furnace, for example, is useful. Oxygen may be passed into the chamber until a white glow is observed at melting temperature, although it is preferred not to flush with oxygen during the actual melting process.

If a conventional platinum crucible is used, the reaction between the components appears to be quenched and the desired glass will not be obtained. Therefore, melting must be done in a container free of platinum. Any other container useful for making glass will do, and mullite ($3Al_2O_3 \cdot 2SiO_2$) serves very well.

The time required to form the glass once the mixture has been fused is not particularly critical. Of course, enough time is allowed for the chemical reaction to become substantially complete. The time will vary, as to be expected, with the temperature and with the molar ratio of components in the mixture. However, for most purposes, if the melt is held at the selected temperature for from about 15 to about 150 minutes, the desired reactions are substantially completed.

To obtain the best combination of properties, in accordance with conventional techniques, it is preferred to anneal the glasses after formation in the melt. In one manner of proceeding, the glasses are annealed between 300° C. and 500° C. for one hour and allowed to cool slowly to room temperature in an annealing unit.

Usually, the glasses are checked for stress distribution by examination under polarized light at room temperature before grinding and polishing by conventional techniques.

Another preferred feature of this invention is in the unique after treatment of the germanium dioxide-silicon carbide glasses of this invention. This comprises polishing them, e.g., with jeweler's rouge, alumina, and the like, then subjecting them to a heat treatment near their softening point i.e., preferably within the transformation range, in the presence of a reducing atmosphere such as hydrogen, or an atmosphere consisting of hydrogen and an inert gas such as nitrogen or argon etc. This precipates a thin film of highly glossy, i.e., mirror-like, elemental germanium on the surface of the glass. It appears that the thin elemental germanium film is amorphous in its initial stages. By such a technique it is surprisingly found that a thin film of germanium can be put on a non-conducting substrate without the need to employ a vapor deposition technique. These films may be employed as infra-red reflectors. The layer may may be obtained in a crystalline form by prolonged periods of heating at high temperatures. Flms of Ge produced by the process of this invention are more adherent than films deposited by prior art techniques such as vapor deposition.

The temperature at which the polished surface is contacted with hydrogen, e.g., in an electrically heated furnace, will be sufficiently high to soften the glass but not high enough actually to melt it. This will include the middle of the annealing range but will be substantially below the melting range, in general. For example, a temperature of from about 350 to about 800° C. can be used. Preferred temperatures will be from about 450 to about 750° C. or most preferably at 400 to 500° C. Below the preferred range, longer time is required; above the preferred range, although shorter times are possible, melting tends to become a factor and crystallization also is observed. Illustrative times of treatment are from about 1 hour to about 8 hours, depending on the temperature or from one-quarter to 24 hours also depending on the temperature.

A focused laser beam may be applied at an effective wave length and power to selectively form a thin film of elemental germanium on the surface of a germanate glass composition as hereinafter defined. The laser beam or the germanate glass substrate may be moved in a predetermined pattern at a controlled rate to produce a thin film at predetermined loci. This pattern may be formed as an electronic semi-conducting circuit.

The reducing atmosphere may be contained in a closed vessel which is designed to prevent the loss of the selected reducing atmosphere and the inert cooling atmosphere. Any material which transmits infra-red waves up to about 15 microns when formed as an aperture, e.g. elemental germanium, Irtran-2, lithium fluoride, calcium fluoride, sodium fluoride, barium fluoride and the like may be used as a window.

When the glass is cooled, it should be maintained in a relatively inert atmosphere, such as argon, helium, nitrogen and the like. Where a laser is employed, it may not be essential to cool the material in an inert atmosphere as the heating of the substrate will be effected in localized areas and the heat will be readily dissipated.

It is preferred to use this after-treatment at a temperature of from about 400 to about 550° C. for about 5 hours on glasses prepared from mixtures of 0.85 to .999 mol of germanium dioxide, and the remainder, from 0.15 to a trace of silicon carbide. It is especially preferred to use a glass prepared from a mixture of 0.95 mol of germanium dioxide and about 0.05 mol of silicon carbide.

While the preferred substrate for the production of a thin film of elemental germanium is the above-noted oxygen deficient germanium glass, the thin film may be applied to any germanate glass which comprises at least 60 mole percent of germanium dioxide. These compositions may include one or more components selected from the group consisting of aluminum oxide, niobium carbide, tungsten carbide, titanium carbide, zinc oxide, barium oxide, cadmium oxide, magnesium oxide, anthracene and tantalum boride.

Also there may be employed germanate glass compositions such as those disclosed in a thesis presented by John Philip de Neufville at Harvard University which was titled "A Study of Glass Formation in the $GeO_2$-Ge System," which is hereby incorporated by reference.

Selected additures such as antimony compounds or arsenic compounds may be employed in the germanate glass substrate to alter the electrical characteristics of the thin film. Depending on the desired electrical characteristics the amount and type may be varied.

Without departing from this invention in its broadest aspects, various additives may be introduced into the instant glasses to obtain conventional results. For example, additives to impart colors may be employed. Minor proportions of other elements can also be added to provide variations in the softening point and for other reasons. The glasses can also be irradiated with ultra-violet light in the molten state to vary their properties, particularly, their strengths.

DESCRIPTION OF THE PREFERRED EMBODIMENTS

The following examples illustrate the preparation of the novel glasses of this invention and describe their properties. The examples are illustrative only, and are not to be construed to limit the scope of the invention in any manner whatsoever.

EXAMPLE 1

A powdered mixture of 0.95 mol of electronic grade germanium dioxide and 0.05 mol of silicon carbide is melted under standard furnace conditions at 1500° C. in a new mullite crucible in an electric-fired Harrop NMR-7 unit. To keep the furnace chamber in the oxidizing state it is periodically flushed with oxygen until a clean white glow is observed at the melting temperature. No oxygen is passed into the chamber during the actual melting process. The relative viscosities of the melt are determined by using a qualitative S.A.E. method. The melt is maintained at 1500° C. for one hour. At this temperature there is an intensive fuming response, the glass is deep orange and it has a relative viscosity of 80W. The glass is cooled slowly to room temperature in an annealing unit.

For comparison purposes, a melt of stoichiometric germanium dioxide, i.e., no silicon carbide is added, is prepared under similar conditions. A striking contrast is noted. The glass shows no fuming tendency, but even though it is melted at its upper melting temperature, its relative viscosity is 140W, effectively twice that of the non-stoichiometric glass in its molten state.

Both glasses transmit infrared radiation well over the range of 2.5 to 4.0 microns.

For comparison purposes, a third glass sample is prepared by melting 0.95 mol of germanium dioxide and 0.05 mol of carbon (graphite). This mixture behaves like the stoichiometric germanium dioxide glass; no fuming is observed; viscosity is relatively high; the resulting glass is water white, but graphite shows no tendency to react chemically like silicon carbide.

EXAMPLE 2

Two glasses are prepared by the procedure of Example 1. The first from a mixture comprising 0.90 mol of germanium dioxide and 0.10 mol of silicon carbide; and the second from 0.85 mol of germanium dioxide and 0.15 mol of silicon carbide. Both readily melt at 1450° C., but have high fuming activity. The viscosity of a melt of the 0.90 mol germanium-containing glass is only 65W. There is obtained a light yellow-brown glass. Because of intense fuming and frothing, only a small amount of glass is obtained from the 0.85 mol germanium dioxide-containing glass.

EXAMPLE 3

Using the procedure of Example 1, but varying the reaction temperature, time, and annealing conditions, a series of glasses are prepared from 0.95 mol germanium dioxide and 0.05 mol of silicon carbide.

The conditions, observations and results are summarized in Table 1.

TABLE 1

[Non-stoichiometric glass from 0.95 mol germanium dioxide and 0.05 mol of silicon carbide]

| Melt | Melting conditions | Anneal | Viscosity | Description of glass |
|---|---|---|---|---|
| 2 | 1,500° C.—1 hr | No | 85W | Light yellow-brown. |
| 2-A | 1,500° C.—4 hrs.; cooled at 25° C.; reheated, poured at 1,500° C. | No | 120W | Light yellow; bubbles. |
| 2-B | 1,300° C.—2½ hrs | No | 80W | Deep yellow-green. |
| 2-C | 1,200° C.—2 hrs | No | | Foamed, transparent. |
| 2-D | 1,400° C.—2 hrs | 500° C | 85W | Cusps formed. |
| 3 | 1,300° C.—1 hr.; 1,450° C.—1 hr. | 300° C | 90W | Light yellow. |
| 4 | 1,300° C.—1 hr.; 1,500° C.—1 hr. | 300° C | 90W | Do. |
| 5 | 1,300° C.—1 hr | 340° C | 85W | Light yellow-green. |
| 6 | 1,300° C.—1 hr.; 1,500° C.—1 hr. | 340° C | 85W | Do. |
| 7 | 1,300° C.—1 hr.; 1,450° C.—1 hr. | 340° C | 85W | Do. |
| 8 | 1,300° C.—1 hr.; 1,450° C.—1 hr. | 340° C | 85W | Do. |
| 10 | 1,360° C.—2½ hr. poured at 1,500° C. | 350° C | 80W | Do. |
| 11 | 1,450° C.—2 hrs | 340° C | 80W | Deep yellow-green. |
| 13 | 1,300° C.—1 hr.; 1,450° C.—1 hr. | 340° C | 80W | Light yellow-green. |
| 14 | 1,300° C.—1 hr.; 1,450° C.—1 hr. | 340° C | 80W | Do. |
| 15 | 1,300° C.—1 hr.; 1,450° C.—1 hr. | 340° C | 80W | Do. |
| 16 | 1,450° C.—2 hrs | 340° C | 80W | Seedy. |
| 17 | 1,375, 1,500° C.—2 hrs. 1,500° C.—45 min. | 340° C | 75W | Light yellow-green. |
| 18 | 1,375, 1,525° C.—4 hrs. 1,525° C.—40 min. | 340° C | 75W | Do. |
| 19 | 1,450° C.—2 hrs | 340° C | 75W | Do. |

The glass from melt 18 was of especially excellent quality.

Infrared diagnoses of selected samples are carried out on a Perkin Elmer Model 521 spectrophotometer. Scale expansion up to 5× is employed when unusual absorption peaks are suspected. Vitreous samples are ground and polished to reduce reflection losses due to irregular surface topography. Model 521 is capable of scanning the range from 2.5 to 40 microns (4000 to 250 cm.$^{-1}$). $As_2S_3$ is used for qualitative calibration of the equipment. The room temperature transmission of the various samples at various wavelengths of the infrared spectrum are given in Table 2:

TABLE 2

[Infrared transmission of $GeO_2$ glasses]

| | Melt No. | | | Stoic. $GeO_2$ |
|---|---|---|---|---|
| | 8 | 11 | 18 | |
| Sample thickness, mm | 5.1 | 11.1 | 5.9 | 4.8 |
| Refractive index | 1.637 | | | |
| | Percent transmission | | | |
| Wave length, microns: | | | | |
| 2.5 | 84 | 73 | 83 | 40 |
| 3.0 | 69 | 50 | 76 | 40 |
| 3.5 | 80 | 70 | 78 | 40 |
| 4.0 | 78 | 64 | 75 | 38 |
| 4.5 | 40 | 30 | 52 | |
| 5.0 | 5 | | 5 | 10 |
| 5.5 | | | | 7 |
| 6.0 | | | | 5 |

It is seen that excellent I.R. wavelength transmissions are obtained. A stoichiometric germanium dioxide glass used for comparison purposes, because such glasses are used for optics transparent to the infrared region of the electromagnetic spectrum, transmits less light than the glasses of this invention. It is also noteworthy that the glass from Melt 11 transmitted a surprisingly large percentage of the infrared radiation, even though it was twice as thick as the stoichiometric glass and about twice as thick as the glasses from Melts 8 and 18.

EXAMPLE 4

The glass of Example 3, Table 1, designated Melt 5, is polished with jeweler's rouge or alumina at room temperature (about 23° C.) then heated in a hydrogen atmosphere in an electrically-heated tube furnace at 500° C. for 5 hours. It is cooled to room temperature in the presence of argon. After this treatment there is a glossy silvery mirror-like deposit of elemental germanium on the surface of the glass. If the glass is held up to a light source, one can see through it (the estimated film thickness is 100–200 Angstroms). Longer periods will provide thicker films, i.e. 24 hours at 400° C. yields an amorphous film about 63.5 μm. thick.

The glass of Example 3, Table 1, designated Melt 2, is polished then heated at 400° C. for 8 hours, or at 600° C. for 2 hours, and is transformed into a glass with a coating of glossy elemental germanium. If the heat treatment is carried out at 700° C. for 1 hour, substantially the same results are obtained.

Extended treatment of the glasses of Examples 1–3 above 350° C. in the presence of hydrogen also causes the precipitation of elemental germanium on the surface and in the region sub-adjacent the surface. Examples 5–16 were carried by a procedure analogous to that set forth in Example 4:

3. A process as defined in claim 1 wherein said germanate glass composition is an oxygen deficient germanate glass which is prepared by a process which comprises melting together a mixture which consists essentially of 0.85 to 0.95 moles of powdered germanium dioxide and from 0.15 moles to about 0.05 moles of silicon carbide at a temperature of between about 1200° C. and 1600° C. in a container free of platinum and then allowing the melt to cool and solidify.

4. A process as defined in claim 1 wherein the layer of elemental germanium is amorphous.

5. A process as defined in claim 2 wherein the germanate glass composition is heated to a temperature in the range of from about 350 to about 800° C.

6. A process as defined in claim 5 wherein the germanate glass composition is heated to a temperature in the range of 450 to 750° C.

7. A process as defined in claim 5 wherein the germanate glass composition is heated to a temperature in the range of about 400 to about 500° C.

8. A process as defined in claim 2 wherein the ger-

EXAMPLES 5-16

|  | 5 | 6 | 7 | 8 | 9 | 10 | 11 | 12 | 13 | 14 | 15 | 16 |
|---|---|---|---|---|---|---|---|---|---|---|---|---|
| $GeO_2$ | 95.0 | 87.8 | 95.0 | 95.0 | 95.0 | 97.0 | 90.0 | 95.0 | 75.0 | 70.0 | 60.0 | 75.0 |
| SiC | 5.0 | 7.3 | 5.0 | 5.0 | | | 5.0 | | | | | |
| $Al_2O_3$ | | 4.9 | *2.0 | *5.0 | | | | | 10.0 | 10.0 | 10.0 | 10.0 |
| NbC | | | | | | | 5.0 | | | | | |
| WC | | | | | | | | | 3.0 | | | |
| TiC | | | | | 5.0 | | | | | | | |
| ZnO | | | | | | | | | | | | 15.0 |
| BaO | | | | | | | | | | | | |
| CdO | | | | | | | | | | 20.0 | 30.0 | |
| MgO | | | | | | | | | 15.0 | | | |
| SrO | | | | | | | | | | | | |
| Anthracene | | | | | | | *5.0 | | | | | |
| $TaB_2$ | | | | | | | | 5.0 | | | | |

*In excess of 100 mole percent.

It should be appreciated that many other variations and changes in the invention will immediately suggest themselves to those skilled in the art. Such variations and changes are deemed to be within the purview of those skilled in the art and scope of this invention as defined in the appended claims.

What is claimed is:

1. A process for the formation of a thin film of elemental germanium on the surface of a germanate glass composition which includes at least 60 mole percent of germanium dioxide, said method comprising polishing the surface and heating it in the presence of a reducing gas until formation of a thin film of elemental germanium on the surface of said germanate glass composition is substantially complete and thereafter cooling said glass composition in an inert atmosphere.

2. A process as defined in claim 1 wherein said reducing gas is hydrogen and said inert atmosphere is argon.

manate glass composition is heated for a period of from about one-quarter to about 24 hours.

9. A process as defined in claim 2 wherein the germanate glass composition is heated for a period of from 1 to 8 hours.

10. The product produced by the process of claim 1.

References Cited

UNITED STATES PATENTS 3,511,683   5/1970   Espensheid _____ 117—124 C

MAYER WEINBLATT, Primary Examiner

E. L. ROLLINS, Assistant Examiner

U.S. Cl. X.R.

117—160 R